United States Patent [19]
Niwa et al.

[11] Patent Number: 5,327,425
[45] Date of Patent: Jul. 5, 1994

[54] NETWORK SYNCHRONIZATION CONTROL SYSTEM AND CONTROL METHOD

[75] Inventors: Tokuhiro Niwa, Ebina; Masashi Fukuda, Hadano; Ryouichi Matusita, Yokohama; Tutomu Koita, Hadano; Ihei Kajiya, Ebina; Hiroshi Satou, Hadano, all of Japan

[73] Assignees: Hitachi, Ltd., Tokyo; Hitachi Computer Engineering Co., Ltd., Hadano; Hitachi Software Engineering Co., Ltd., Yokohama, all of Japan

[21] Appl. No.: 943,435

[22] Filed: Sep. 10, 1992

[30] Foreign Application Priority Data

Sep. 12, 1991 [JP] Japan .................. 3-233412

[51] Int. Cl.⁵ .......................... H04L 12/40; H04J 3/06
[52] U.S. Cl. ................................. 370/85.1; 370/85.8; 370/92; 370/100.1; 340/825.08; 340/825.54
[58] Field of Search ................. 370/100.1, 103, 105.1, 370/105.4, 105.6, 107, 94.2, 85.13, 85.14, 110.1, 85.15, 85.1, 85.8, 92, 16, 16.1; 375/107, 109, 114, 116, 108; 340/825.08, 825.21, 825.52, 825.54

[56] References Cited

U.S. PATENT DOCUMENTS

| | | | |
|---|---|---|---|
| 4,815,110 | 3/1989 | Benson et al. | 370/103 |
| 4,837,850 | 6/1989 | Maisel et al. | 370/100.1 |
| 4,890,303 | 12/1989 | Bader | 370/103 |
| 5,068,877 | 11/1991 | Near et al. | 375/107 |
| 5,103,447 | 4/1992 | Takiyasu et al. | 370/85.15 |

*Primary Examiner*—Douglas W. Olms
*Assistant Examiner*—Hassan Kizou
*Attorney, Agent, or Firm*—Gerald E. Lester; Gordon T. Arnold

[57] ABSTRACT

A Local Area Network (LAN) is disclosed in which each node includes means for receiving clock signal information from an external network, which may by way of example be another LAN or a wide area network (WAN), and for generating therefrom clock signals for each node of the local network to accommodate synchronous information exchanges with the external network. Any one of the nodes of the local LAN network may act as a Control Node, and any one of the remaining nodes upon instruction from the Control Node may act as a primary Transmission Node for generating clock signals based upon the external network clock signals for all of the nodes of the local LAN network.

11 Claims, 7 Drawing Sheets

NETWORK SYNCHRONIZATION CONTROL SYSTEM AND CONTROL METHOD

RELATED APPLICATIONS

This patent application is related to Japanese Patent Application No. 233,412 filed Sep. 12, 1991, based upon which a claim of priority of filing date is made.

BACKGROUND OF THE INVENTION

This invention relates to Network Synchronization Control Systems for communicating between computer networks, and more particularly to a Network Synchronization Control System for communicating between Local Area Networks (LAN), and between LAN and Wide Area Networks (WAN).

LANs are centralized networks comprised of a communication or transmission line which is shared by a number of nodes, including by way of example work stations, peripherals and file servers. Each node in the network has a unique address, and its reception circuitry constantly monitors the transmission line to determine whether a message is being sent to the node.

A Wide Area Network (WAN) is a computer network that uses high-speed, long-distance communication networks such as those of communication satellites or microwave channels to interconnect nodes including LANS over distances greater than those traversed by LANs alone.

In communicating between LANs, or between a LAN and a WAN, the different clock times of the respective networks must be reconciled before information including voice or image data may be transferred without loss of integrity.

In prior systems, clock signals from an External Network are fed to a control node or sub-control node of a Local Network. Normally, the Control Node supplies the clock signals to all nodes in the Local Network, and the sub-control node supplies the clock signals when the Control Node is inoperative. Such a system is disclosed in Japanese Patent Application No. 21538971987.

In the above prior art, as only two nodes (the control node and the sub-control node) may receive clock signals from the External Network, the ability to design a network system is severely confined. Further, upon both the Control Node and the sub-control node becoming inoperable, meaningful communication with the External Network ceases.

SUMMARY OF THE INVENTION

It is an object of the present invention to provide a Network Synchronization Control System and method by which clock systems from an External Network such as a LAN or WAN may be received by any node in a Local Network, typically a LAN, to realize synchronous communication with the External Network.

To achieve the above object, a Network Synchronization Control System for a communication network is provided in which each node of the Local Network includes means for receiving clock signals from an External Network to provide for synchronous exchange of information between the External Network and the Local Network. Any one of the nodes in the Local Network may act as a Control Node. In addition, any one of the nodes other than the Control Node may act as an External Network clock signal Transmission Node, which upon receiving instruction from the Control Node transmits the external network clock signals to each of the other nodes in the Local Network.

It is a further object of the invention to provide for the continuing operation of the Local Network in the event the reception of the External Network clock signal is interrupted. In the Local Network, in accordance with the invention, the Control Node inquires of each of the other nodes whether an External Network clock signal is being received. Upon receiving replies to the inquiries, the Control Node issues an instruction to generate clock signals to one of the nodes receiving an External Network clock signal. That node becomes the Transmission Node which supplies clock signals to each node in the Local Network. Thereafter, the Control Node periodically checks the operational status of each node and the status of the clock signal information being received by the Transmission Node. If the Transmission Node indicates to the Control Node that an interruption has occurred in receiving the External Network clock signal, the Transmission Node ceases to generate clock signals for the Local Network and the Control Node instructs one of the other nodes receiving an External Network clock signal to become the Transmission Node for the Local Network. Thus, unlike prior art systems, synchronous exchanges of information between the Local Network and the External Network may continue even if only a single node in the Local Network is operating and receiving clock signals from the External Network.

BRIEF DESCRIPTION OF THE DRAWINGS

The invention will now be described further with reference to the accompanying drawings, in which.

DESCRIPTION OF THE PREFERRED EMBODIMENT

Figure 1:
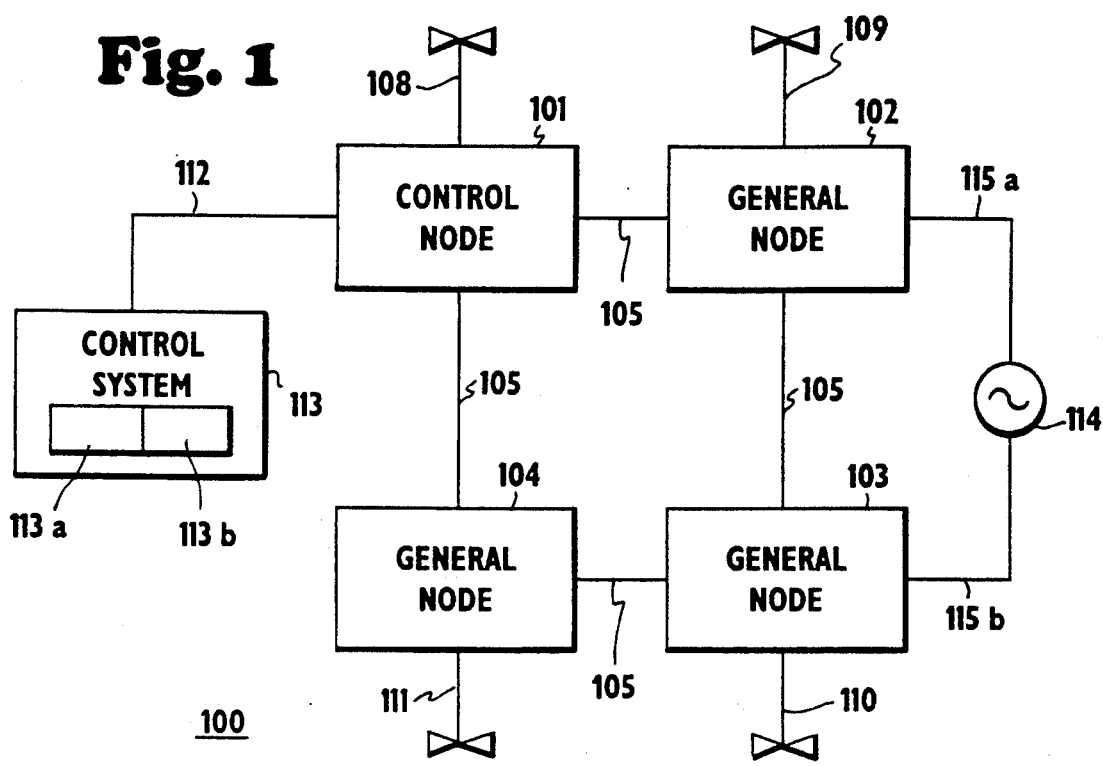
FIG. 1 is a functional block diagram of a Local Area Network (LAN) in accordance with the present invention.

Referring to FIG. 1, a Local Area Network (LAN) 100 in accordance with the present invention is illustrated, which comprises a Control Node 101 and three General Nodes 102, 103 and 104 that are electrically interconnected by a transmission line 105. Each of the nodes respectively has connected thereto one of communication channels 108, 109, 110 and 111 for exchanging information, by way of example, with computers, filer servers, disk storage units, printers, user terminals, telephone sets, facsimiles, and other peripherals, or for receiving clock signal sources from an External Network.

It is to be understood that each node may accommodate plural communication channels.

In LAN 100, at least one node is used as a Control Node, and any of the nodes can serve as the Control Node. In the embodiment illustrated in FIG. 1, for purposes of explanation only, node 101 has been designated the Control Node, and is connected by way of channel 112 to a control system 113. The control system 113 is a user terminal which may include an input means 113a such as a keyboard, and a display means 113b such as a video display or printer. A start of synchronous operation command may be entered by way of the input means 113a to begin the exchange of information between the LAN and an External Network. The display means 113b displays those nodes of the LAN which are receiving the External Network clock signals, and the node or nodes of the LAN which are supplying the External Network clock signals to all nodes in the LAN in a manner to be more particularly described below.

The Control Node, upon receipt of the start of synchronous operation command by way of control system 113, queries the remaining nodes of LAN 100 to determine which of the nodes is receiving clock information from the External Network. In the embodiment illustrated in FIG. 1, the clock information from the External Network is received by General Nodes 102 and 103 from clock source 114 by way of clock transmission lines 115a and 115b, respectively. It is to be understood, however, that any one or more of the nodes of LAN 100 may receive the External Network clock signals.

Each of the nodes senses its information channels to determine whether it is receiving a repeated timing pattern, which for purposes of explanation will be referred to as a normal state, and so informs the Control Node in replying to the query. In the embodiment of FIG. 1, General Nodes 102 and 103 upon being queried would inform the Control Node that clock signal information is being received and that a normal clock state exists. General node 104, however, would inform the Control Node that no clock information is being received and that an abnormal clock state exists.

Upon receiving responses to its query, the Control Node designates one of General Nodes 102 and 103 as the Transmission Node for providing all nodes of LAN 100 with the External Network clock signals. Synchronous information exchanges between the LAN and the External Network thereupon may occur by way of channels 108, 109, 110 or 111.

While the embodiment of FIG. 1 depicts a clock source received by way of clock control lines 115a and 115b, it is also possible to extract the External Network clock signal from information received by way of one of the channels 108, 109, 110 or 111.

Figure 2:
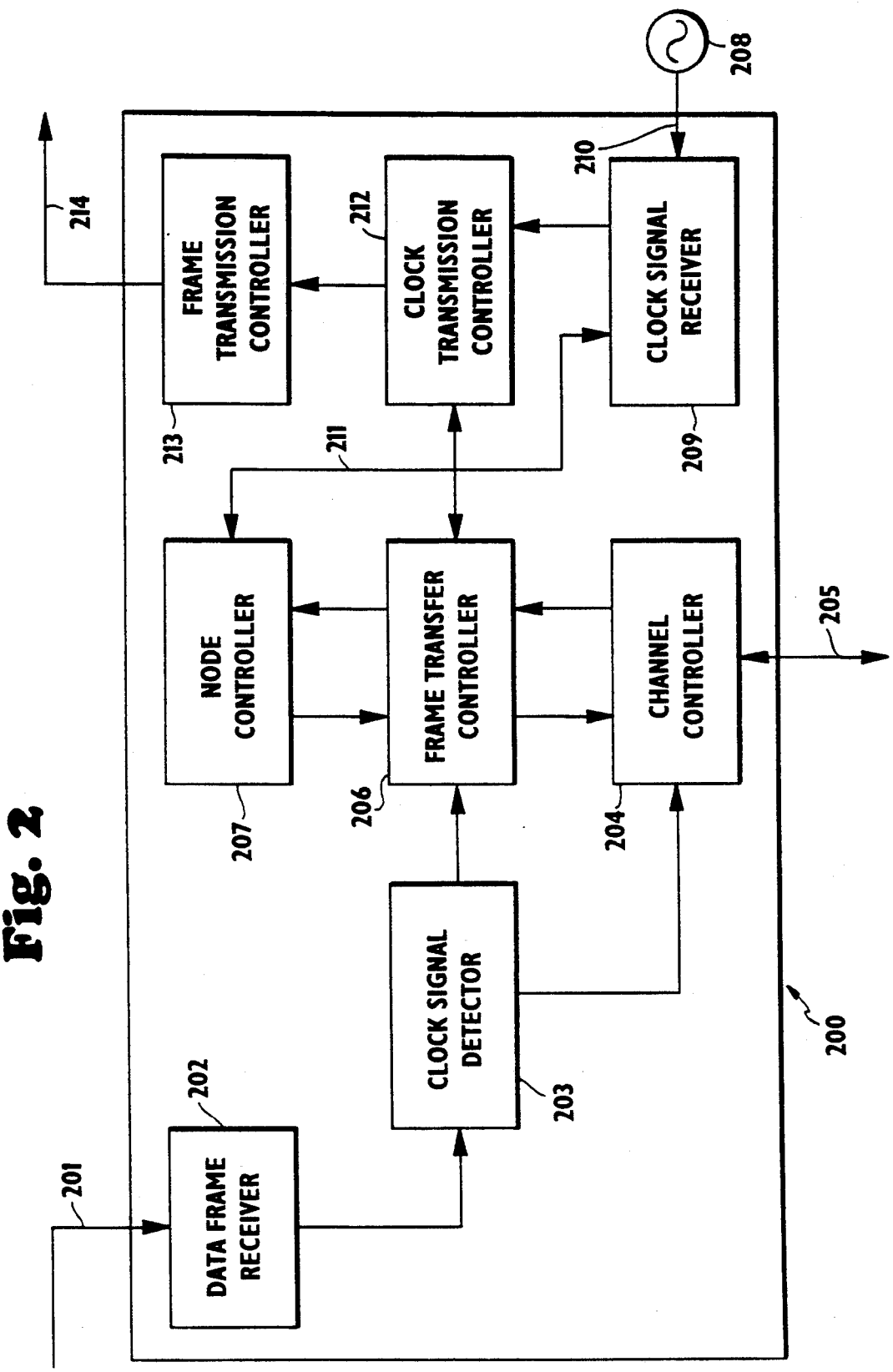
FIG. 2 is a functional block diagram of a node used in the LAN network system of FIG. 1.

Referring to FIG. 2, a functional block diagram of a node 200 is illustrated which exemplifies nodes 101, 102, 103 and 104 of FIG. 1. A message in the form of a data frame is forwarded by a Control Node in the LAN network on transmission line 201. The data frame is received by a data frame receiver 202 which is comprised of a serial-to-parallel converter and a first-in-first-out (FIFO) memory unit.

In response to the LAN network clock, which is independent of any External Network clock, the data frame is fed through the data frame receiver 202 to a clock signal detector 203, which reads the External Network clock signal appearing in the data frame, and transmits the clock signal to a channel controller 204. Controller 204, which may for example be a CCITT X.21 or X.24 interface, or an FDDI or Ethernet interface, both transfers information to and receives information from a channel 205 in synchronization with the External Network clock signal.

The clock signal detector 203, upon transferring the data frame to a transfer controller 206, also transmits the External Network clock information to channel controller 204. The controller 206 first reads information stored in the data frame to compare a stored destination node address with its own node address. If there is a match, the controller 206 reads information stored in the data frame which indicates the type of information which has been received. If the indicated information type is control information, the communication information appearing in the data frame is transferred from controller 206 to node controller 207. Otherwise, the communication information appearing in the data frame is transferred to the channel controller 204. In any event, the data frame header or overhead section (as will be more particularly described below), which includes all of the network timing information, is sent by controller 206 to controller 207.

The External Network clock signal is supplied by a clock source 208 to a clock signal receiver 209, which monitors the clock signal transmission line 210 to ensure that a regular clock signal pattern is being received. If so, the receiver 209 transmits a signal on line 211 to the node controller 207 to indicate a normal clock signal state as before described. If a normal clock state does not exist, the receiver 209 transmits a signal on line 211 that indicates an abnormal clock state.

If a normal clock signal state is indicated by receiver 209 on line 211, and the data frame information received by the controller 206 from detector 203 indicates that control type information is stored in the data frame and that the node 200 is to act as an External Network clock Transmission Node, the controller 206 forwards the data frame information to node controller 207 which in turn instructs the controller 212 by way of controller 206 to generate clock signals. In response to information and instructions received from node controller 207, controller 206 stores information including the node address of node 200 in a location of a new relay data frame to identify the node 200 as a Transmission Node, and further stores in the relay data frame External Network clock information received from clock transmission controller 212. Thereafter, the new relay data frame is supplied by controller 206 to controller 212. The controller 212 in turn aligns the relay data frame with a frame clock signal which is generated by the controller, and which is derived from External Network clock information received from controller 207 by way of the relay data frame and from External Network clock signals received from controller 209. The node 200 thereupon becomes the Transmission Node for the LAN network.

If controller 207 receives an abnormal clock state signal on line 211, or the data frame information received from detector 203 fails to identify node 200 as an External Network clock Transmission Node, the controller 207 instructs the controller 206 to relay the External Network clock signal information resident in the data frame as received from detector 203 without activating the clock generator of controller 212 and without storing new clock signals in the relay frame.

It is important to note that with receiver 209 and controller 212 being included in each node of the LAN network, any of the nodes may be available as a backup Transmission Node.

Upon receipt of the relay data frame from controller 212, the frame transmission controller 213 issues the data frame to the other modes of the LAN network by way of transmission line 214.

Figure 3:
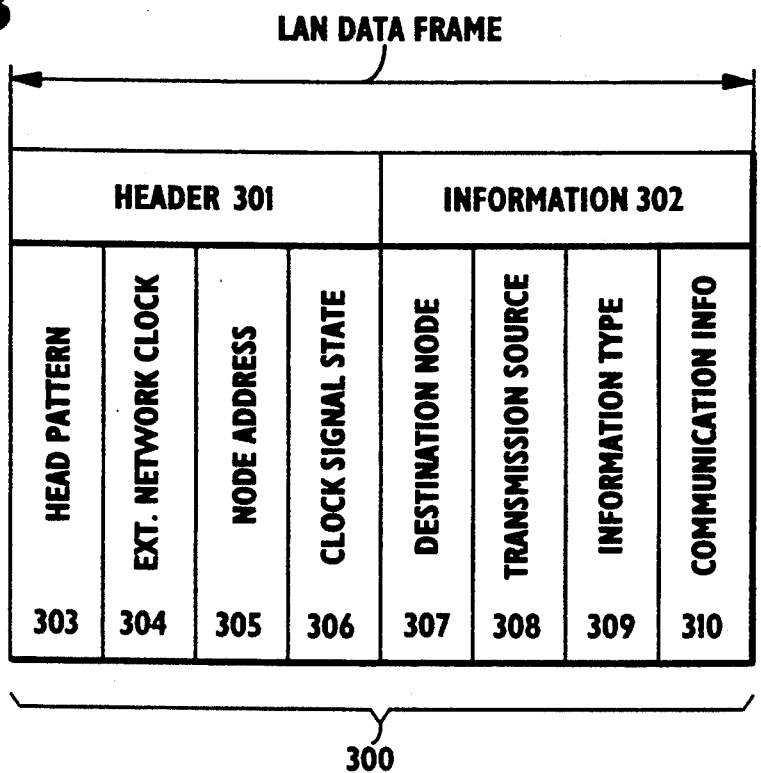
FIG. 3 is an illustration of the format of a data frame in accordance with the present invention.

In FIG. 3, the format of a data frame in accordance with the invention is disclosed. A data frame 300 consisting of a frame header 301, and an information section 302 is depicted. The header 301 consists of a frame head pattern slot 303, a clock signal information slot 304, a node address slot 305, and a clock signal state slot 306.

The frame head pattern slot 303 includes a bit pattern for indicating the start of a data frame, and slot 304 is used to store an External Network clock pattern and corresponding data. Slot 305 is used to store the address of the node in the LAN network which will be the External Network clock Transmission Node. Slot 306 is used to indicate the External Network clock signal state (normal, abnormal) as determined by clock signal receiver 209.

The information section 302 consists of a destination node address slot 307, a transmission source address slot 308, an information type slot 309, and a communication information slot 310.

Slot 307 is used to identify the address of the next node which will receive the data frame, and slot 308 is used to identify the address of the node which is the source of the data frame. Slot 309 is used to identify the communicators information in slot 310 as being either communication information or control information.

The operation of node 200 of FIG. 2 now is described in more detail by reference to FIG. 3.

Prior to synchronous operation with an External Network, a node controller 207 of a Control Node in the LAN network creates an inquiry data frame for each of the other nodes of the LAN network by indicating in the information type slot 309 that control information is stored in the communication information slot 310. The control information stored in slot 310 requests each destination node as identified in slot 307 to indicate by a reply data frame whether the destination node is receiving an External Network clock signal.

Upon receipt of an inquiry data frame from a Control Node, the data frame receiver 202 of the destination node analyzes the head pattern stored in slot 303 of the inquiry frame to detect the start of the inquiry frame. Thereafter, the inquiry frame is transferred to the clock signal detector 203 which reads slot 304, and in response thereto applies a clock signal to controller 204 to accommodate a synchronous exchange of information with channel 205. In addition, the data frame is passed on to frame transfer controller 206. Upon matching the node address appearing in slot 307 with the node address of the receiving node, controller 206 reads the information stored in slot 309 to determine whether control information is indicated. If so, the inquiry data frame is transferred to the node controller 207, which reads the information stored in slot 310, and in response thereto stores the clock state information appearing on line 211 in slot 306 of a reply data frame. The controller 207 further stores the Control Node's address in slot 307 of the reply data frame, stores its own node address in slot 308, and stores a control type indication in slot 309. If the clock state as indicated on line 211 is normal, controller 207 issues a generate clock instruction by way of controller 206 to clock transmission controller 212. The controller 212 generates clock signals based upon clock signal information read by controller 207 out of slot 304 of the inquiry data frame, and upon clock signal information received from the clock signal receiver 209. Controller 206 receives External Network clock signals from controller 212, and stores such clock signals in slot 304 of the reply data frame. The reply data frame thereupon is supplied to controller 212 for alignment with a frame clock signal generated by the controller, and thereafter returned to the Control Node by way of frame transmission controller 213 and transmission line 214.

Upon receiving a reply data frame from another node, the Control Node processes the reply data frame as before described, and reads the clock signal state in slot 306 of the reply frame to determine whether the General Node identified in slot 308 may act as the LAN network's External Network clock Transmission Node. Each of the General Nodes will transfer a reply data frame to the Control Node which similarly will be processed. The Control Node thereupon will be able to designate one of the General Nodes receiving a viable External Network clock signal to be the clock Transmission Node for the LAN network. The designation occurs by setting slot 309 of a command data frame to indicate control type information, by inserting a generate clock instruction in slot 310, and by placing the node address of the intended Transmission Node in slots 305 and 307. Upon receipt of the command data frame, the designated Transmission Node supplies the External Network clock signals to all nodes in the LAN network. Synchronous exchanges of information between the LAN network and the External Network thereupon may begin.

Figure 4:
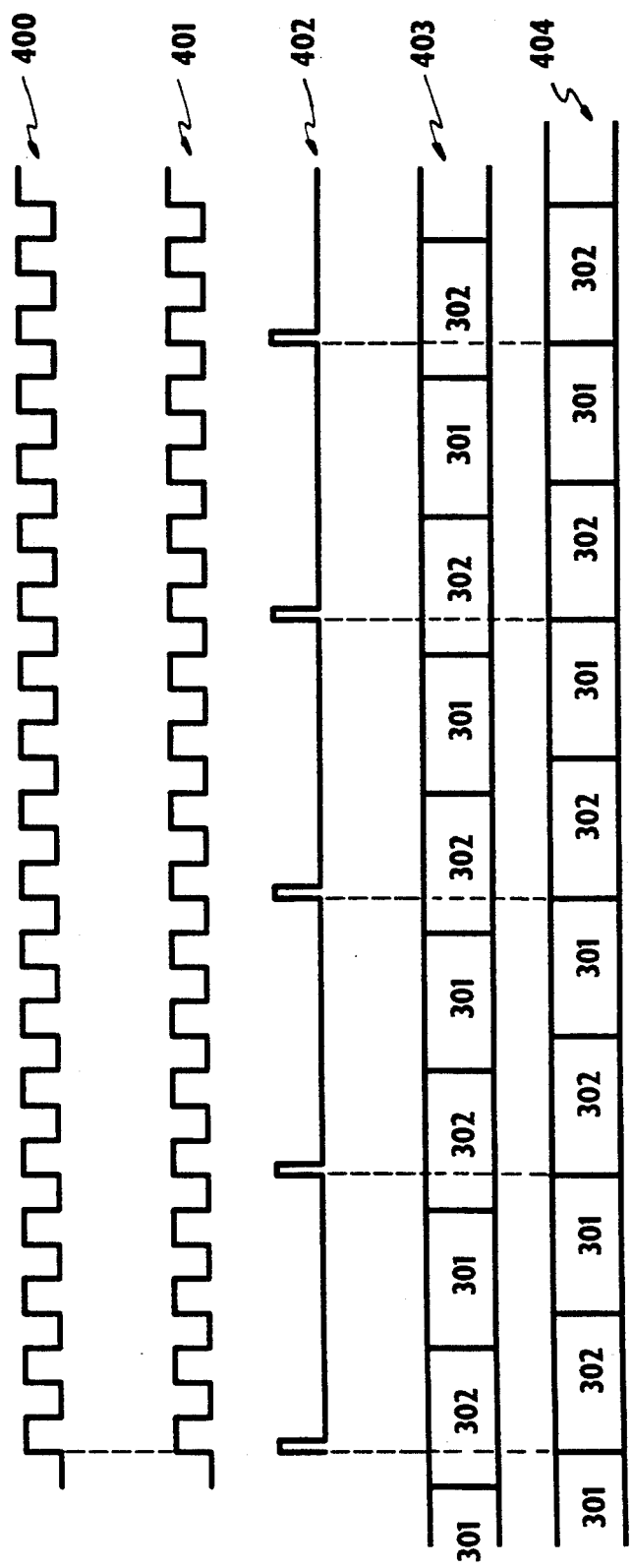
FIG. 4 is a timing diagram of the operation of controllers 206, 212 and 213, and receiver 209 of FIG. 2.

Referring to FIG. 4, a clock signal 400 is shown which represents the External Network clocking signal applied on transmission line 210 to the clock signal receiver 209 of FIG. 2. The receiver 209 issues a signal on transmission line 211 to inform the node controller 207 that an External Network clock signal has been received, and transmits the clock signal 401 to the clock transmission controller 212. If the controller 212 receives a clock signal generation instruction from controller 207 by way of controller 206 as before described, the controller 212 generates clock signal 402 in response to the receipt of both clock signal 401 from receiver 209 and clock information read from slot 304 of a data frame received by way of transmission line 201. The time between the pulses comprising clock signal 402 of FIG. 4 is equal to the time length of a data frame. The controller 212 also receives data frames from controller 206 as illustrated graphically at 403 of FIG. 4. As before described, each data frame is comprised of a header section 301 and an information or data section 302 as illustrated in FIG. 3. The controller 212 reads the head pattern of a relay data frame supplied by controller 206 to determine the start of the header 301, and thereby aligns the start of the information section 302 of the data frame with the pulses of the clock signal 402 as illustrated at 404. The data frames thereupon are output from controller 212 to controller 213 for transmission to other nodes in the LAN network by way of transmission line 214 of FIG. 2.

Figure 5:
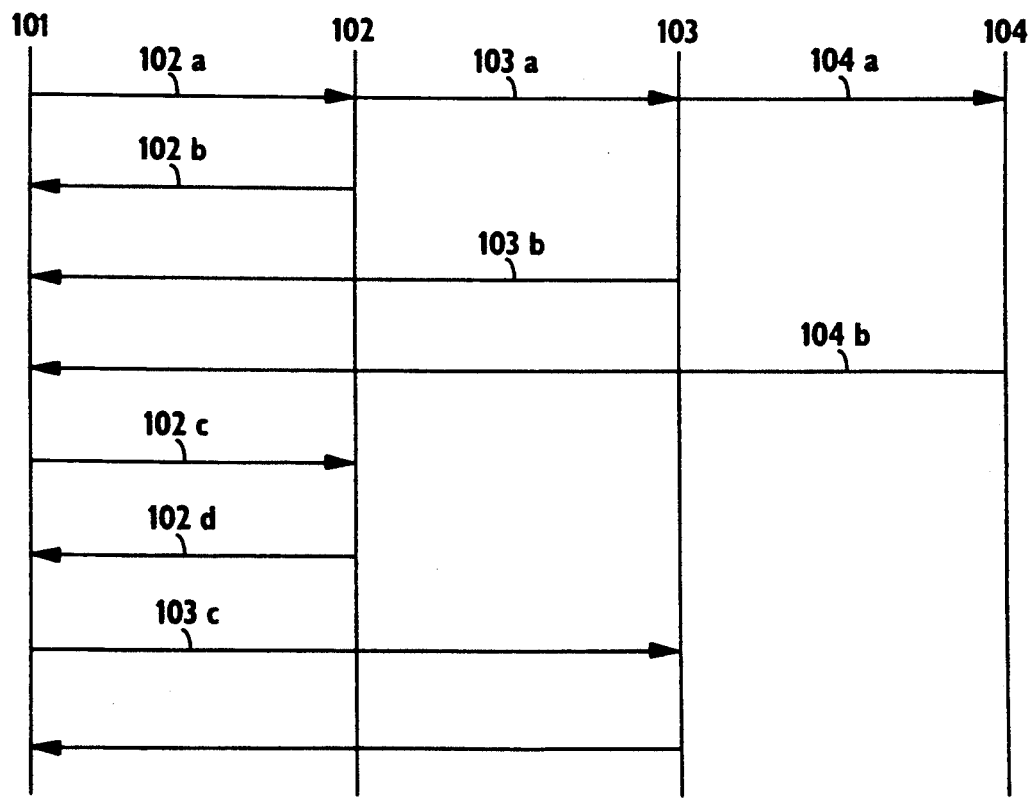
FIG. 5 is a graphic illustration of an inquiry made by the Control Node as to the state of an External Network clock signal, and a repeated inquiry by the Control Node as to the operating state of each node of the LAN network.

Upon the Control Node's designating a Transmission Node, and the synchronous exchange of information with the External Network commencing, the Control Node continues to issue inquiries to the nodes in the local LAN network to determine whether they are operating effectively. The inquiry issued by the Control Node to each of the General Nodes in the LAN network to determine whether External Network clock signals are being received is illustrated graphically in FIG. 5. Referring to FIG. 5, the reference numbers 101, 102, 103 and 104 identify the Control Node and General Nodes, respectively, of the LAN network of FIG. 1. Prior to the execution of any synchronous operation with an External Network, the Control Node 101 issues an inquiry data frame to each of the General Nodes in the LAN network as represented by reference numbers 102a, 103a, and 104a. In the inquiry data frames, the address of the General Node for which the inquiry frame is intended is entered in slot 307 of the data frame, and a control designation is written into the information type slot 309 to inform the General Node that the information in slot 310 is control information. Upon receiving the inquiry data frame, the general nodes create a reply data frame in which a control indication is written into slot 309 of the reply data frame, and an indication that external clock signal information is being received is stored in slot 306. Such a reply data frame thereupon is transmitted to the Control Node 101 by each of the general nodes as indicated by the reference numbers 102b, 103b, and 104b of FIG. 5.

Upon receiving the reply data frame, the Control Node 101 is able to discern which of the General Nodes is receiving a valid External Network clock signal upon reading slots 306, 308 and 309. The source of the reply frame is identified by its node address in slot 308. Upon determining that one or more of the General Nodes is receiving valid External Network clock signals, the Control Node generates a command data frame in which the General Node that will act as the Transmission Node for the LAN network is identified by its node address in slot 305. Further, the Control Node writes a control information designation in slot 309 and an instruction to generate clock signals in slot 310. The address of the intended Transmission Node also is entered in slot 307, and the data frame thereafter is transmitted to the LAN network. Upon receipt of the data frame by the intended Transmission Node as identified by its node address in slot 305 and 307 of the received data frame, the Transmission Node generates clock signals for each node of the LAN network, which signals are based upon the clock information received from the External Network.

After the designation of a Transmission Node for providing External Network clock signals to each node of the LAN network, the Control Node 101 continues to make inquiries concerning the operating state of each of the nodes and the state of the clock signal information being received by the nodes from the External Network. Referring again to FIG. 5, the Control Node 101 by way of example issues an inquiry 102c to the Transmission Node 102. The Transmission Node thereupon replies to the Control Node as indicated at 102d, and if the reply indicates that the clock signal being received from the External Network is normal, the Transmission Node 102 continues to generate clock information for the LAN network. If, however, the Transmission Node 102 fails to reply, or the reply indicates that the External Network clock signal is not normal, the General Node 102 ceases to generate clock signals for the LAN network, and the Control Node 101 issues a command frame to a second General Node receiving the External Network clock signal as indicated by reference number 103c. The General Node 103 thereupon becomes the Transmission Node and continues to be the clock source for the LAN network so long as it replies to the Control Node 101 and indicates that the clock signal received from the External Network is normal. If an abnormality is indicated, however, the Control Node 101 selects yet another node to become the Transmission Node as above described.

It is seen, therefore, that each node of the LAN network has the capacity to receive clock signal information from the External Network, and exchange communication data with the External Network. Further, as each node of the LAN network has the capacity to function as a Control Node, a Transmission Node, and as a General Node, the likelihood of the exchange of information with an External Network becoming degraded because of a lack of synchronization is made remote.

Figure 6:
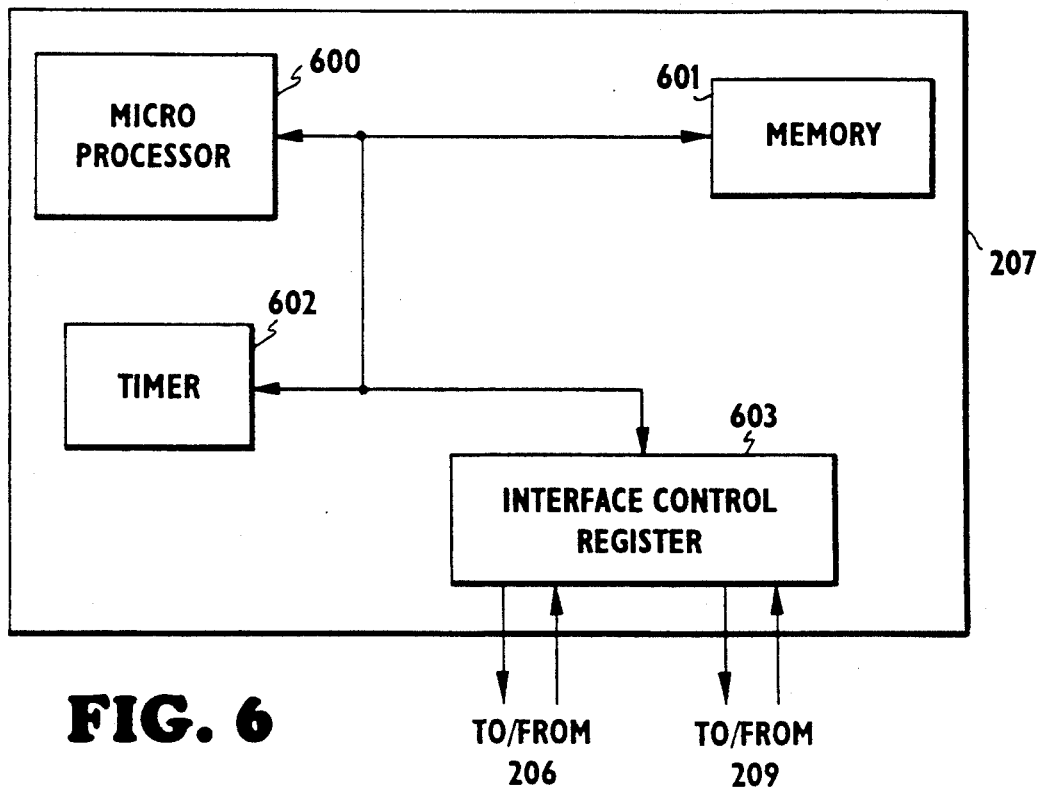
FIG. 6 is a functional block diagram of the node controller 207 of FIG. 2.

Referring to FIG. 6, the node controller 207 is shown as comprising a microprocessor 600, a memory 601 in which the computer software for controlling the operation of a node resides, a timer 602 and an interface control register 603. The microprocessor 600 accesses the computer software program residing in memory 601 to control the operation of the node in which it resides. In accordance with the computer program instructions, the microprocessor sets and senses the timer 602 to detect a time out that indicates that an inquiry data frame should be created to determine (1) the status of each of the nodes comprising the Local Network, and (2) which of the nodes is receiving a normal external network clock signal.

The normalcy of a received external network clock signal may be determined by well known correlation techniques in which the received clock signal is compared with predetermined patterns. In the alternative, normalcy may be determined by merely detecting the presence of a continuous signal.

The microprocessor 600 also communicates with the frame transfer controller 206 and the clock signal receiver 209 of FIG. 2 by way of the interface control register 603. As before described, data frame transfers occur between the node controller 207 and the controller 206, and the receiver 209 indicates to the controller 207 on line 211 when a normal external clock signal has been detected.

The embodiment of the invention as herein disclosed comprises the addition of a clock transmission controller 212 and a clock signal receiver 209 in each node of the Local Network System, the software control program stored in memory 601 of each node controller 207 of each node of the Local Network System, and in the data frame structure 300 operating in conjunction with the software control program to accommodate an asynchronous exchange of information between the Local Network and the External Network. Otherwise, the apparatus of FIG. 2 is generally used in LAN Systems and is well known.

Figure 7:
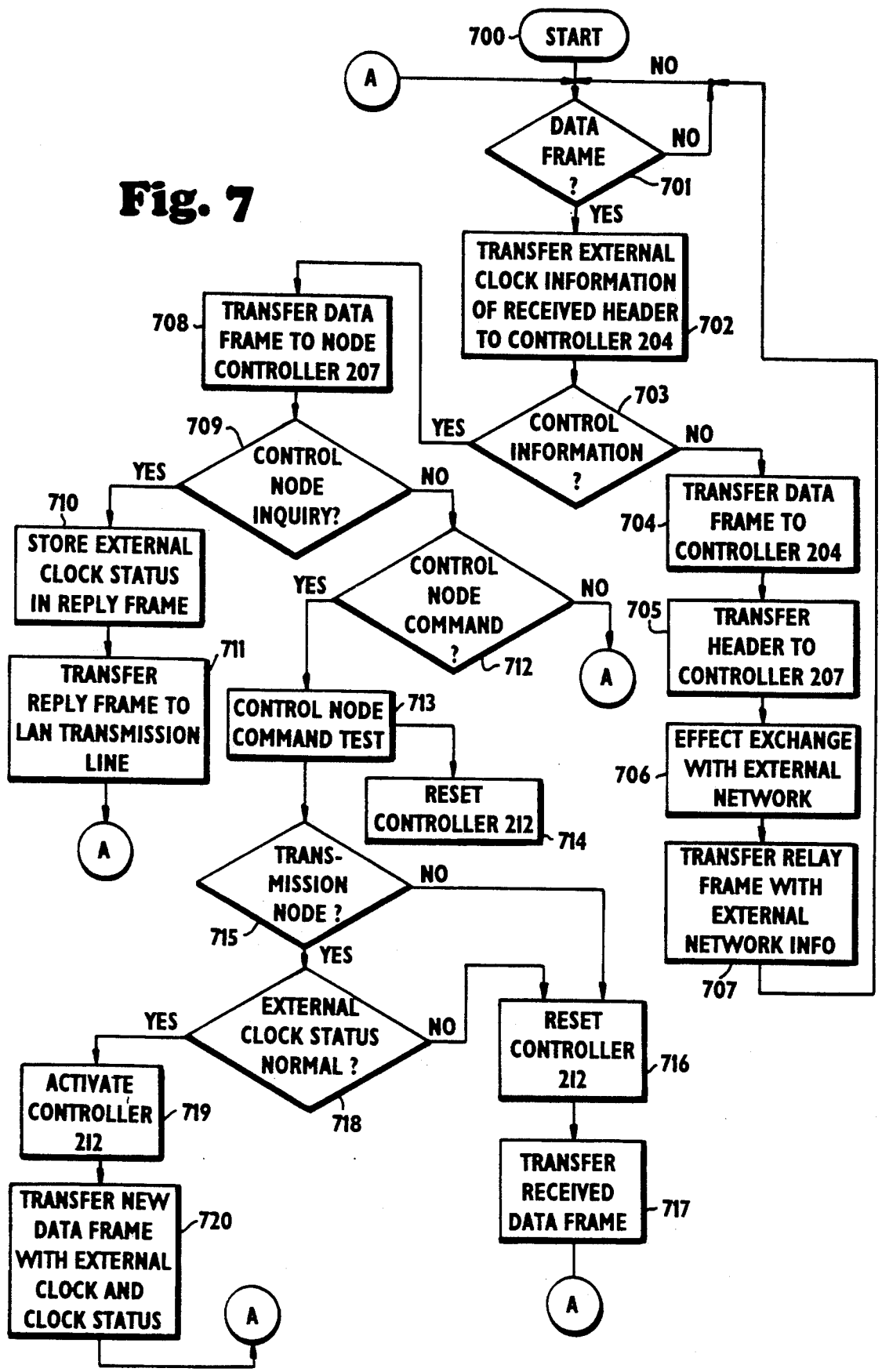
FIG. 7 is a logic flow diagram of the operation of a General Node in accordance with the invention.

Referring to FIG. 7, the operation of a General Node in a LAN network is shown in logic flow diagram form. It is to be understood that the logic flow diagram illustrates the operation of a node as further illustrated in FIGS. 2, 3 and 6 in combination with a computer software program stored in memory 601 of node controller 207.

Upon beginning operation at step 700, the microprocessor 600 reads the interface control register 603 at step 701 to determine whether a data frame has been received from controller 206. If not, the step is repeated until a data frame is received. If the presence of a data frame is detected in register 603, however, the external network clock signal appearing in slot 304 of header 301 of FIG. 3 is transferred from the clock signal detector 203 to the controller 204 at step 702 of FIG. 7. Thereafter, slot 309 of the information section 302 of the data frame is sensed at 703 to determine whether the communication information occurring in slot 310 is control information. If not, the controller 206 transfers the data frame to controller 204 at step 704, and the header of the data frame which contains all the timing information required to operate the node is transferred to controller 207 at step 705. Thereafter, an exchange of information with the external network occurs at step 706, where the information received from the external network may be stored in slot 310 of the data frame and the type of information received stored in slot 309. The data frame then is updated to indicate the address of the destination node at slot 307 and the current node address is entered in slot 308. The data frame thereafter is transferred by way of clock controller 212 and frame transmission controller 213 to the network transmission line 214 as shown in FIG. 2. The process then returns to step 701 to await the arrival of a next data frame.

If the information type detected at step 703 indicates control information, the process proceeds to step 708 where the controller 206 transfers the data frame to the interface control register 603 of the node controller 207. Thereafter, the microprocessor 600 reads the data frame information at step 709 to determine whether a control node inquiry is being made as to the receiving node's status. If so, the external clock status as received from receiver 209 is stored in the interface control register 603 and read at step 710 by the microprocessor 600. The status thereafter is stored in slot 306 of the data frame header. The data frame thereafter, is updated at step 711 for transfer back to the control node, and the process returns to step 701.

If the data frame is not a control node inquiry as determined at step 709, then the microprocessor 600 determines at step 712 whether a control node command has occurred. If so, a control node command test is executed at step 713 which comprises the resetting of the clock transmission controller 212 and later detecting its state to determine whether or not it is properly responding to control node commands.

Upon issuing a reset command at step 713 to the controller 212 at step 714, the process proceeds from step 713 to step 715 where inquiry is made as to whether the current node is a transmission node providing external clock signals to the entire LAN network. If not, the state of the controller 212 is sensed at step 716 and reset if it is active. Thereafter, the received data frame is updated to indicate the current node as being the source of the data frame in slot 308 of the data frame, the destination address of the control node is entered in slot 307, the status of the external clock signal received by the receiver 209 is entered in slot 306 of the data frame header, and the data frame is returned to the control node at step 717. The process thereupon returns to step 701.

If the current node is a transmission node as determined at step 715, and the external clock status as indicated by receiver 209 is determined to be abnormal at step 718, then the controller 212 is reset at step 716 and the data frame is returned to the control node as before described. If the external clock status is determined to be normal at step 718, however, the process proceeds to step 719 where the controller 212 of FIG. 2 is activated to provide external clock signals to the entire LAN network. The data frame then is updated by controller 206 to indicate the current node address at slots 305 and 308 of the data frame 300, the external clock signal generated by controller 212 is entered at slot 304, the status of the external clock signal received from the external network is entered at slot 306, and the data frame is returned to the control node at step 720. The process thereafter returns to step 701.

Figure 8A:
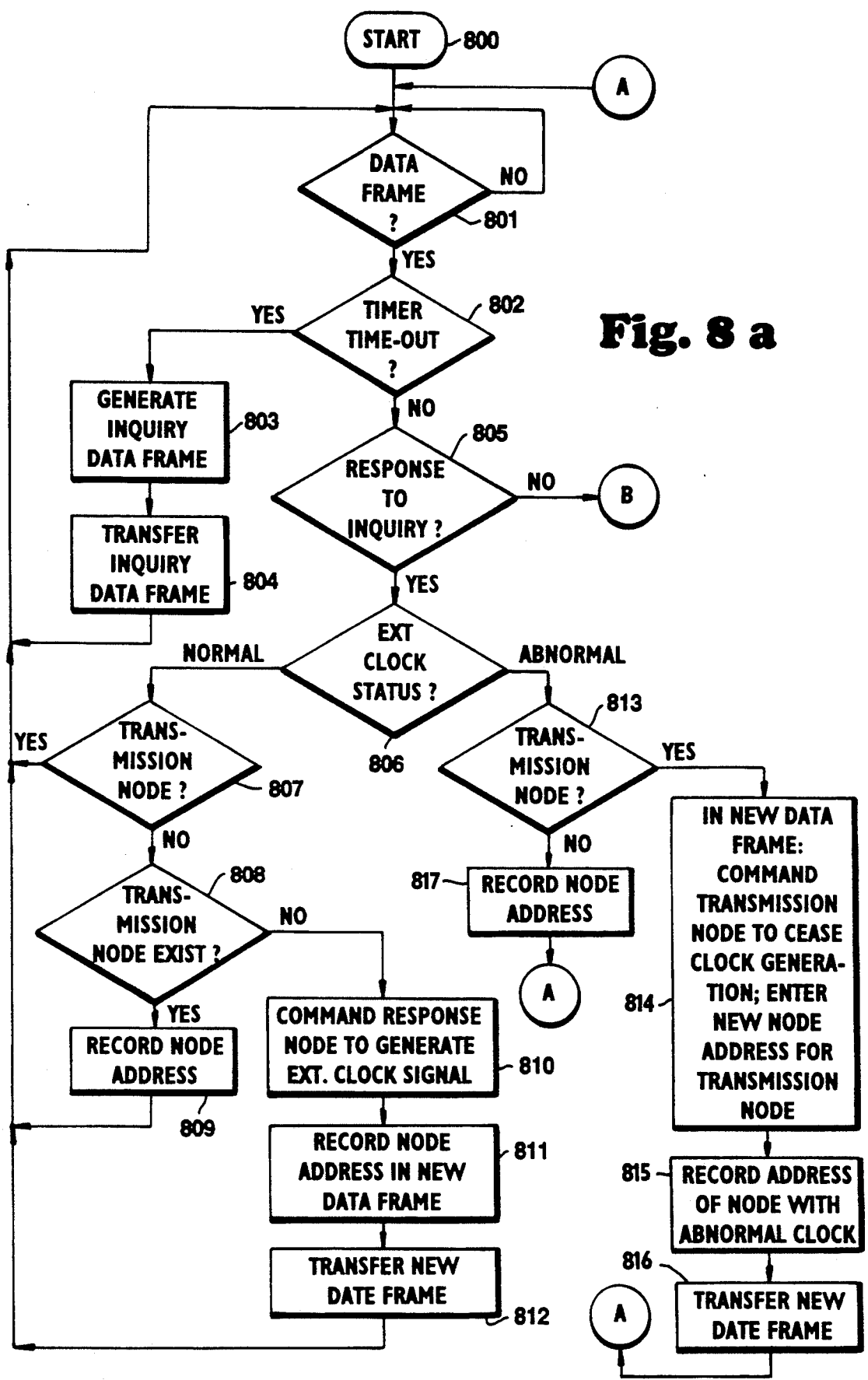
FIGS. 8a and 8b constitute a logic flow diagram of the operation of a Control Node in accordance with the invention.
Figure 8:
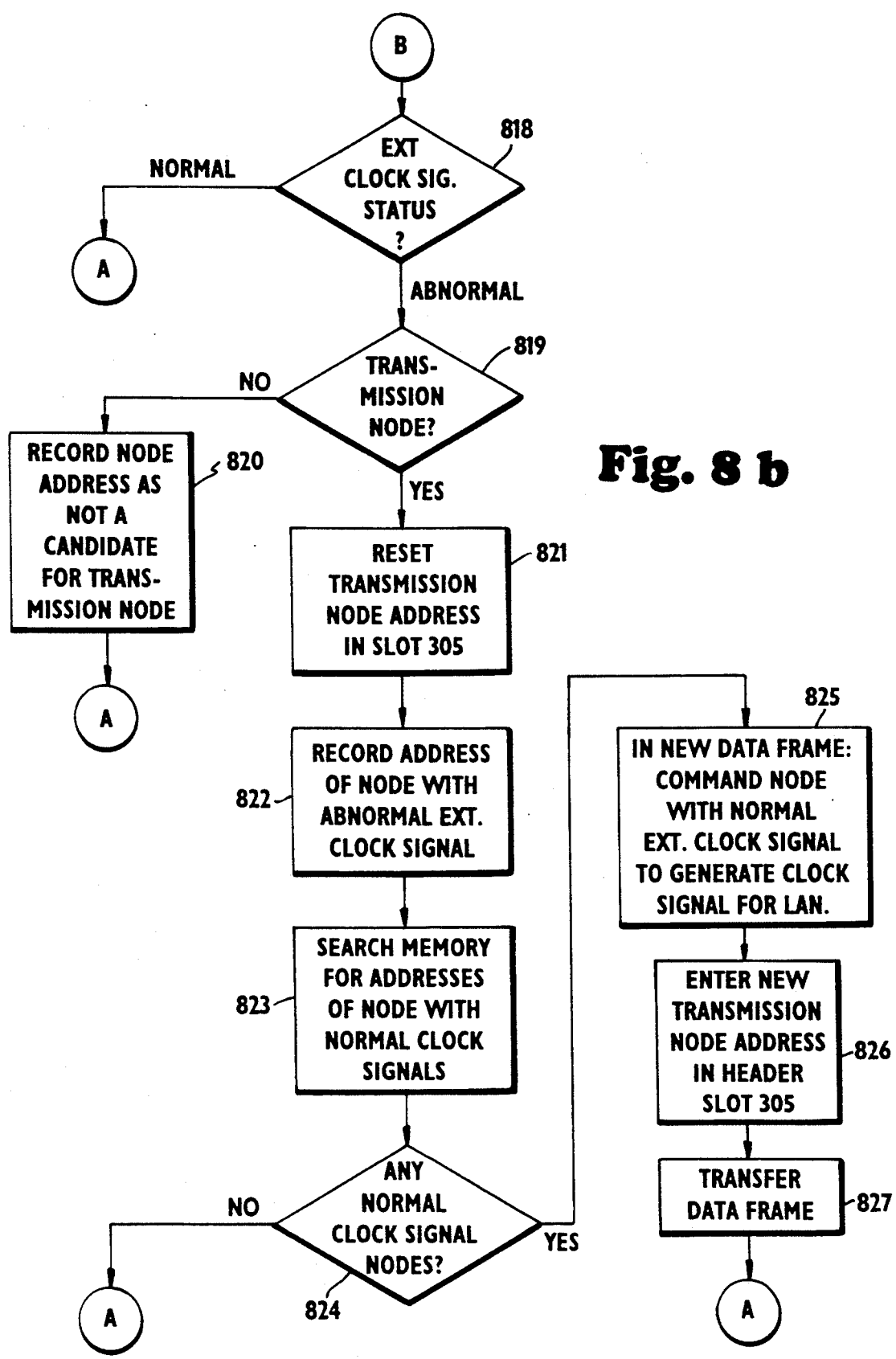

Referring to FIG. 8a, the operation of a Control Node is illustrated in logic flow diagram form. Upon the operation of the control node commencing at step 800, the presence of a data frame is determined at step 801. If no data frame is detected, the step is repeated until the presence of a data frame is detected. Upon the detection of a data frame, the microprocessor 600 at step 802 senses the timer 602 of FIG. 6 to determine whether a time-out has occurred. If so, the Control Node generates an inquiry data frame at step 803 which is transferred to each of the other nodes comprising the LAN network at step 804, and the process returns to step 801. If no time-out is detected at step 802, the microprocessor reads the information stored in the received data frame to determine whether the data frame is a response to a prior inquiry made by Control Node at step 805. If the data frame is a response to a previous inquiry, the process proceeds to step 806 where the status of the external clock signal of the responding node as indicated at slot 306 of the data frame header of FIG. 3 is analyzed. If the clock status is determined to be normal, the process proceeds to step 807 where the node addresses occurring in slots 305 and 308 are compared. If a match occurs, the process returns to step 801 to await the arrival of another data frame. If a match does not occur between the node addresses in slots 305 and 308 of the received data frame, however, the process proceeds from step 807 to step 808 where the microprocessor 600 searches memory 601 to determine whether a transmission node has been designated by the Control Node. If so, the address of the responding node is recorded for future reference as a possible transmission node candidate, and the process returns to step 801. If the Control Node has not designated a transmission node as determined in step 808, however, the process proceeds from step 808 to step 810 where the Control Node enters a command to the responding node in slot 310 of the received data frame to generate external clock signals for the entire LAN network. The address of the responding node thereafter is recorded in memory 601 of the node controller 207 of the Control Node, and in slots 307 and 305 of the received data frame as indicated at step 811. The address of the Control Node is entered in slot 308 of the data frame, which thereafter is transferred back to the responding node as indicated at step 812. The process thereupon returns to step 801 to await the arrival of a new data frame.

If an abnormal clock status is detected in slot 306 of the responding node's data frame as indicated at step 806, the process proceeds from step 806 to step 813, where it is determined whether the responding node is a transmission node for the LAN network. If so, the process proceeds from step 813 to step 814 where the Control Node commands the responding node to cease generating clock information by way of an entry in slot 310 of the received data frame, and a new transmission node address is entered in slot 305. The new transmission node address is found by the microprocessor 600 from a search of memory 601 of the node controller 207 of the Control Node, where the node addresses of transmission node candidates may be found. At step 815, the node address of the responding node is recorded in memory 601 of the node controller 207 of the Control Node as a future reference to indicate that the responding node cannot be used as a transmission node, until such time as the status of the clock signals received from the external network by the responding node change from an abnormal status to a normal status. Thereafter, the received data frame is updated at step 816 as before described and transmitted to the other nodes in the LAN network. The process then returns to step 801 to await the arrival of another data frame.

If it is determined at step 813 that the responding node having an abnormal external clock status is not a transmission node, the address of the responding node is recorded in memory 601 of the node controller 207 of the Control Node to identify the responding node as not being a viable candidate for a transmission node, and the process thereupon proceeds from step 817 to step 801.

If the microprocessor 600 upon sensing the data frame information determines at step 805 that the data frame is not in response to an inquiry made by the Control Node, the process proceeds from step 805 to step 818 of FIG. 8b, where the external clock status of the node sending the data frame is determined by analyzing information stored in slot 306 of the data frame. If the clock status is determined to be normal, the process returns to step 801. If the clock status is determined to be abnormal, however, the process proceeds from step 818 to step 819 where it is determined whether the node which is the source of the data frame is a transmission node. If not, the process proceeds to step 820 where the address of the node is recorded in memory 601 of the node controller 207 of the Control Node to identify the source node as not being a future candidate for a Transmission Node. The process thereupon returns to step 801 of FIG. 8a. If it is determined at step 819 that the source node is indeed a Transmission Node, then the process proceeds to step 821 where the Transmission Node address appearing in slot 305 of the received data frame is deleted. The microprocessor 600 of the node controller 207 of the Control Node thereupon records the address of the source node at step 822 for future reference as a node which cannot be a candidate for the network Transmission Node, and prepares a command data frame which is transmitted to instruct the source node to cease generating clock signals for the network. The process then proceeds to step 823 to search memory 601 for the address of nodes which may be candidates for becoming the Transmission Node. If candidates are found, the process proceeds through step 824 to step 825 where a new data frame is created to send a message to the new Transmission Node to commence generating external clock signals for the LAN network. The address of the Control Node then is entered in slot 308, the command is entered in slot 310, a control information type is entered in slot 309, and the address of the new Transmission Node is entered in slots 305 and 308 of the new data frame as indicated at step 826. Thereafter, the process proceeds to step 827 where the new data frame is transferred to the Transmission Node, upon which occurrence the process returns to step 801.

If no nodes are found in the LAN network which are receiving normal external clock signals from the external network as indicated at step 824, the process proceeds from step 824 to step 801 to await the arrival of a new data frame from one of the other nodes in the network.

In summary, in accordance with the present invention, each node of a LAN network is provided with a functionality to alternatively be a Control Node, a Transmission Node, and a General Node. Upon any one of the nodes being designated a Control Node, it first will issue an inquiry to the remaining nodes of the network to determine which of the nodes is receiving a valid External Network clock signal. Upon determining those nodes which are receiving a valid External Network clock signal, the Control Node will designate one of those nodes to be the Transmission Node for the entire local LAN network. The Transmission Node thereafter generates clock signals for the local LAN network which are based upon the clock signals received from the External Network. A synchronous exchange of information with the External Network thereupon is made possible. During the synchronous exchange, the Command Node is continually making inquiries to the Transmission Node regarding the state of the External Network clock signal being received. If the Transmission Node indicates that the external clock signal is normal, the Transmission Node continues to be the source for clock signals for the LAN network. If an abnormal external clock signal is indicated, however, the current Transmission Node ceases to generate clock signals, and the Control Node designates one of the other General Nodes that is receiving valid external clock signals to be the new Transmission Node. Thus, the synchronous exchange with the External Network may continue without interruption.

While this invention has been particularly shown and described with reference to a preferred embodiment thereof, it should be understood by those skilled in the art that various changes in sequence and form may be made therein without departing from the spirit or scope of the invention as defined by the appended claims. For example, a single node in the Local Network may act as both a Control Node and a Transmission Node. Further, the invention may be applied to a wide variety of network technologies including TDM, TDMA, PBX, FDMA, CDM, MSK, PFK, PSK, TPSK, QPSK and other network technologies.

What is claimed is:

1. In a network having one or more nodes connected to a transmission line and performing communication synchronously with an external network, a network synchronization control system comprising:

a) said one or more nodes each having a clock signal detection means for controlling a synchronous exchange of information between said external network and said one or more nodes in accordance with external network clock signal information received from said transmission line;

b) control node means comprising a first of said one or more nodes for controlling the exchange of control information with the remainder of said one or more nodes on said transmission line; and c) transmission node means comprising a second of said one or more nodes and having an external network clock signal receiving means for receiving clock signals from said external network, and a clock signal transmission control means responsive to said control information received from said control node means on said transmission line for generating said external network clock signal information based upon said clock signals and transmitting said external network clock signal information on said transmission line for said network.

2. A network synchronization control system according to claim 1, wherein said control node means has a control node clock signal receiving means for receiving said clock signals from said external network, and a control node clock signal transmission control means for receiving said clock signals from said control node clock signal receiving means and for generating and transmitting said external network clock signal information on said transmission line for said network.

3. A network synchronization control system according to claim 1 or claim 2, wherein:
   a) said control node means comprises means for periodically issuing an inquiry to each of said one or more nodes as to the status of said clock signals received from said external network, and for commanding one of said one or more nodes issuing a clock normal signal to said control node means to become said transmission node means; and
   b) said transmission node means includes means responsive to said inquiry for comparing said clock signals received from said external network with predetermined patterns and upon detecting a match issuing said clock normal signal.

4. A network synchronization control system according to claim 3, wherein said control node means includes means for storing said inquiry in a communication information slot of a data frame, storing a control information type indication in an information type slot of said data frame, storing a network address of said control node means in a transmission source slot of said data frame, storing in a destination node address slot of said data frame a network address of one of said one or more nodes for which said inquiry is intended, and transmitting said data frame on said transmission line.

5. A network synchronization control system according to claim 1, wherein:
   a) said external network clock signal receiving means correlates clock signal information stored in a data frame received by way of said transmission line with signals received from said external network to determine whether said clock signals have been received from said external network, and generates a clock normal signal upon detection of said clock signals; and
   b) said control node means inquires of each of said one or more nodes whether said clock signals have been received from said external network, selects one of said one or more nodes generating said clock normal signal to be said transmission node means, and command said transmission node means to transmit said external network clock signal information to each of said one or more nodes in said network.

6. A network synchronization control system according to claims 1 or 2 wherein:
   a) said transmission node means detects the status of said clock signals received from said external network, stores a clock signal status indication of whether said clock signals are normal or abnormal in a header section of a data frame, and transmits said data frame on said transmission line to said network; and
   b) said control node means commands one of said one or more nodes other than said transmission node means to transmit external-network clock signal information to said network if said clock signal status indication is abnormal.

7. A method of controlling the synchronous exchange of information between a local network having a plurality of nodes and an external network, comprising the steps of:
   receiving external network clock signal information from said external network by at least one of said plurality of nodes;
   detecting at each of said plurality of nodes the presence of external network clock signals received by way of said local network;
   selecting any one of said plurality of nodes to be a control node which issues inquiries to each of remaining ones of said plurality of nodes as to whether said clock signals are being received from said external network;
   correlating said external network clock signal information with said clock signals received by way of said local network to determine at each of said remaining ones of said plurality of nodes that said clock signals are being received from said external network;
   replying by said remaining ones of said plurality of nodes to said control node whether said clock signals are being received from said external network;
   selecting a transmission node by a command from said control node to one of said remaining ones of said plurality of nodes that is receiving said clock signals from said external network; and
   generating at said transmission node in response to said command said clock signals for all of said plurality of nodes based upon said external network clock signal information.

8. The method set forth in claim 7 above further comprising the steps of:
   issuing an inquiry from said control node to said transmission node to request a reply indicating whether said transmission node is receiving said clock signals from said external network;
   detecting at said transmission node whether said clock signals are being received from said external network;
   issuing said reply from said transmission node to said control node in response to said inquiry as to whether said clock signals are being received from said external network; and
   in the event said clock signals received from said external network are not detected by said transmission node, selecting by instruction of said control node a second transmission node from any one of said plurality of nodes other than said transmission node which has detected the receipt of said clock signals from said external network.

9. A network synchronization control system in a communication network which has a plurality of nodes connected to a transmission line to form a local network, and which is connected to an external network and synchronously exchanging information therewith, said network synchronization control system comprising:
   a) a clock signal receiver means in at least one of said plurality of nodes for receiving external clock signals from said external network, correlating said external clock signals with a clock signal pattern and upon detecting a match generating a status signal to indicate the occurrence of a normal external clock signal;

b) a clock transmission controller means in said at least one of said plurality of nodes for generating local network clock signals and other data frame signals in response to said external clock signals received by said clock signal receiver means; and
c) means in at least a remaining one of said plurality of nodes for activating said clock transmission controller means of said at least one of said plurality of nodes from which said status signal is received.

10. A network synchronization control system in a communication network having a plurality of nodes connected to a transmission line on which said plurality of nodes exchange communications in the form of data frames, and one or more of said plurality of nodes is connected to an external network, said network synchronization control system which comprises:
a) clock signal detection means in each of said plurality of nodes for detecting external clock signals in said data frames received from said transmission line;
b) clock signal receiver means in each of said one or more of said plurality of nodes for receiving said external clock signals from said external network, and generating a clock normal signal when said external clock signals are normal;
c) clock transmission controller means in each of said one or more of said plurality of nodes for receiving said external clock signals from said clock signal receiver means and storing said external clock signals in one of said data frames upon receipt of a command signal in another one of said data frames received from said transmission line;
c) channel controller means in each of said plurality of nodes responsive to said external clock signals received from said clock signal detection means for effecting a synchronous exchange of information with said external network; and
e) means responsive to said clock normal signal in one of said plurality of nodes for issuing said command signal in said another one of said data frames to said clock transmission controller means of one of said plurality of nodes issuing said clock normal signal.

11. The network synchronization control system set forth in claim 10, wherein said data frames are comprised of:
a) a header section including a head pattern slot for identifying the beginning of a data frame, an external network clock slot for storing clock patterns representative of said external clock signals received from said external network, a node address slot for identifying which of said plurality of nodes shall be the source of said external clock signals and other data frame signals for said communication network, and a clock signal state slot of indicating whether said external clock signals received by said one or more of said plurality of nodes from said external network are in a normal state; and
b) an information section including a destination node slot for identifying a network address of a node for which a data frame is intended, a transmission source address slot for identifying a network address of a source of a data frame, a communication information slot into which information to be exchanged between nodes is stored, and an information identification slot for indicating whether said communication information slot has control information.

* * * * *